No. 758,537. PATENTED APR. 26, 1904.
J. S. KEMP.
FERTILIZER DISTRIBUTER.
APPLICATION FILED MAY 27, 1902.
NO MODEL. 2 SHEETS—SHEET 2.
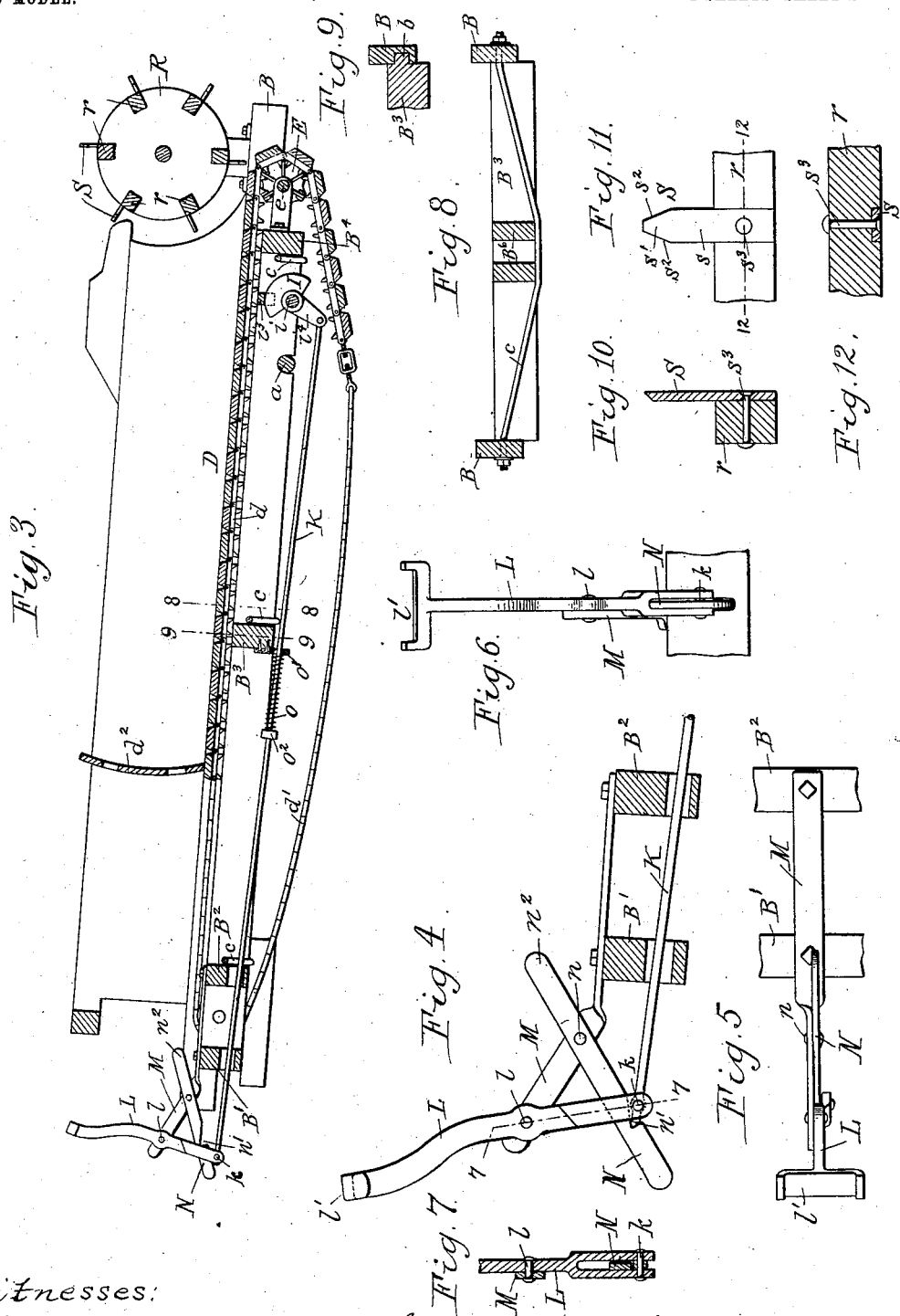
Witnesses:
E. A. Volk.
John N. Snyder Jr.
Joseph S. Kemp
by Wilhelm Bonner
Attorneys.
Inventor.

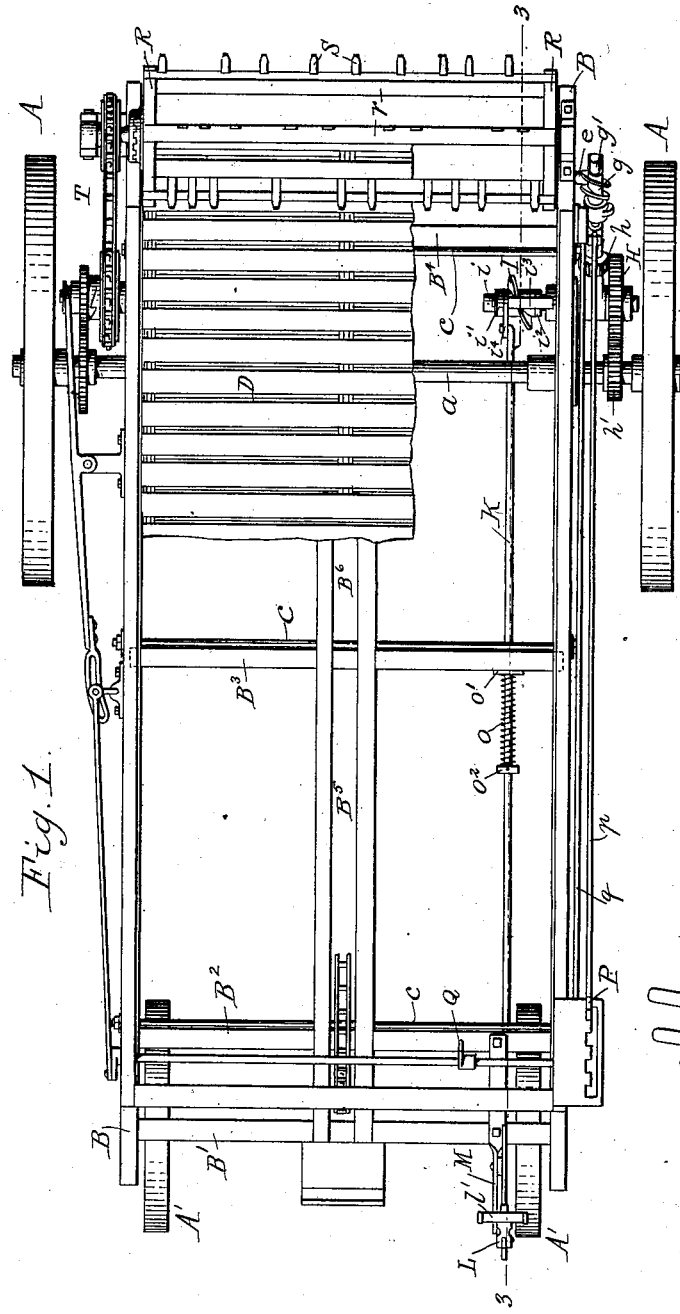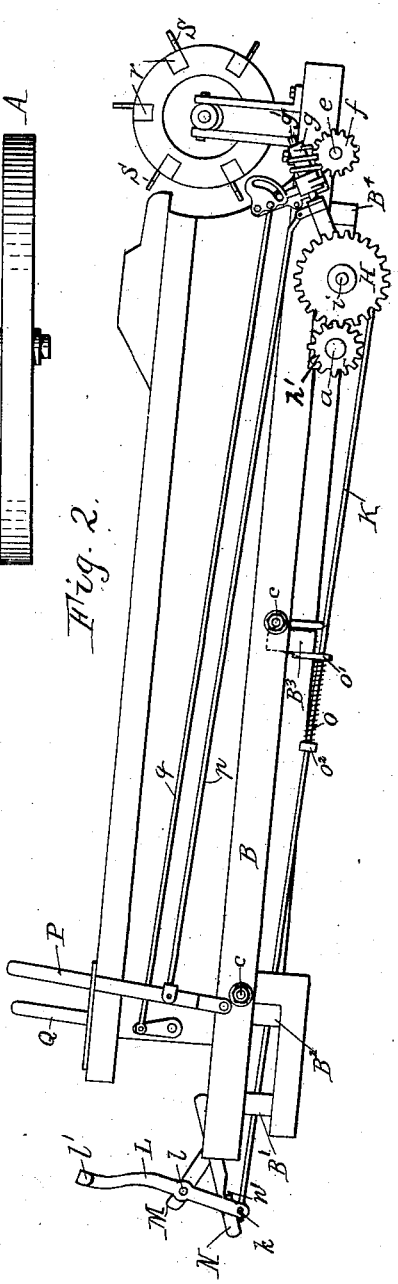

No. 758,537. Patented April 26, 1904.

UNITED STATES PATENT OFFICE.

JOSEPH SARGENT KEMP, OF NEWARK VALLEY, NEW YORK.

FERTILIZER-DISTRIBUTER.

SPECIFICATION forming part of Letters Patent No. 758,537, dated April 26, 1904.

Application filed May 27, 1902. Serial No. 109,226. (No model.)

*To all whom it may concern:*

Be it known that I, JOSEPH SARGENT KEMP, a citizen of the United States, and a resident of Newark Valley, in the county of Tioga and State of New York, have invented new and useful Improvements in Fertilizer-Distributers, of which the following is a specification.

This invention relates to that class of manure-spreaders or fertilizer-distributers which embody a box or body mounted on a wheeled frame, a rotary or other suitable beater arranged at the rear end of the box or body, and a movable bottom, apron, or other suitable mechanism for feeding the load of fertilizer in the box or body slowly against the beater. A machine of this character is shown and described in my Letters Patent No. 695,212, March 11, 1902. In the machine shown in that patent the movable bottom is operated from the rear axle on the left-hand side of the machine by a gear-wheel on the axle, a gear-disk meshing therewith and having on its inner side several concentric gear-rims, a longitudinal shaft which is provided at its front end with a pinion which can be adjusted forwardly or backwardly to mesh with one of these gear-rims, thereby regulating the feed movement of the bottom, and a worm-gearing connecting the rear end of this longitudinal shaft with the bottom. This gear-disk can be moved outwardly away from the pinion for disconnecting this feed mechanism and stopping the movement of the bottom, either for stopping the spreading of fertilizer temporarily or for changing the speed of the bottom and the resulting rate of spreading per acre. For moving the gear-disk out of and into mesh with the pinion the disk is secured to the outer end of a short transverse shaft which is provided at its inner end with a spiral cam connected with the shaft in such manner that by turning the cam in one or the other direction the shaft is moved in the direction of its length, and the gear-disk is moved out of or into mesh with the pinion. The mechanism for turning or rocking the cam is a hand mechanism located in convenient reach of the driver at the front end of the machine.

The object of my present invention is to provide a more convenient and more quickly acting foot mechanism for throwing this gear mechanism into and out of engagement.

Figure 1 is a top plan view of a fertilizer-distributer embodying my improvements. Fig. 2 is a side elevation of the same with the running-gear removed. Fig. 3 is a longitudinal section in line 3 3, Fig. 2. Fig. 4 is a sectional side elevation of the foot mechanism on an enlarged scale. Fig. 5 is a top plan view of the same. Fig. 6 is a front elevation thereof. Fig. 7 is a vertical transverse section in line 7 7, Fig. 4. Fig. 8 is a cross-section of the body-frame in line 8 8, Fig. 3. Fig. 9 is a cross-section through the end of one of the cross-sills in line 9 9, Fig. 3. Fig. 10 is a sectional elevation of one of the beater teeth and staves. Fig. 11 is a face elevation thereof. Fig. 12 is a section through the tooth and stave in line 12 12, Fig. 11.

Like letters of reference refer to like parts in the several figures.

A represents the rear wheels, $a$ the rear axle, and A' the front wheels.

B represents the side sills of the body-frame; B' B², the front cross-sills; B³, the intermediate cross-sill, and B⁴ the rear cross-sill.

B⁵ represents the longitudinal central sills, which extend forwardly from the intermediate sill B³ to the rearmost front cross-sill B², and B⁶ represents similar longitudinal central sills which extend rearwardly from the intermediate sill B³ to the rear cross-sill B⁴. The cross-sills are provided at their ends with tenons $b$, Fig. 9, which enter mortises in the inner sides of the side sills. The tenons of the cross-sills are held in the mortises of the side sills by transverse truss-rods $c$, which connect the side sills and bear with their depressed middle portions against the under sides of the longitudinal central sills, Fig. 8. Each of these truss-rods extends upwardly and outwardly on the outer sides of the longitudinal central sills and extends with its end portions horizontally through the side sills and is secured on the outer sides of the latter by screw-nuts. One of these truss-rods is arranged near the rearmost front cross-sill B², the intermediate cross-sill B³, and the rear cross-sill B⁴, Figs. 1 and 3. The truss-rods do not only stiffen the frame, but also enable the cross-sills to be connected with the side sills without arranging screw-bolts in the cross-sills, so that by this improved construction the weakening of the cross-sills by attaching bolts is avoided and a very strong and durable frame is produced.

D represents the slat-bottom; $d$, the chain to which the slats are secured; $d'$, the return-chain which connects the ends of the bottom, and $d^2$ the follower at the front end of the bottom.

E represents the spider at the rear end of the machine for driving the bottom; $e$, the transverse shaft to which the spider is secured; $f$, the worm-wheel at the outer end of the shaft; $g$, the worm on the longitudinal worm-shaft $g'$; $h$, the pinion on the worm-shaft; H, the gear-disk meshing with said pinion, and $h'$ the gear-wheel on the rear axle meshing with this gear-disk. $i$ is the short transverse shaft, to the outer end of which the gear-disk H is secured. I is the spiral cam mounted loosely on the inner end of this shaft between collars $i'$ $i^2$ and engaging in a grooved bearing $i^3$, and $i^4$ represents the arm on the cam by which the latter is oscillated. All of these parts of the mechanism by which the movable bottom is actuated and the parts so far mentioned by which the mechanism is thrown into and out of gear may be constructed as described and shown in my above-mentioned Letters Patent or in any other suitable manner.

My improved foot mechanism for throwing the load-feeding mechanism into and out of gear is constructed as follows: K represents an actuating-rod which extends from the arm $i^4$ forwardly on the left-hand side of the machine and is connected at its front end by a bolt $k$ with the lower arm of a foot-lever L. The latter is pivoted by a bolt $l$ to the front end of a supporting-arm M, which is secured upon the front cross-sills B' B² and projects forwardly and upwardly therefrom. The foot-lever is provided at its upper end with a foot-piece $l'$. The lower arm of the foot-lever is bifurcated, Figs. 4 to 7, and straddles the front portion of the actuating-rod K, which latter projects forwardly beyond the bolt $k$. N represents a latch or locking-pawl which is pivoted near its rear end by a bolt $n$ to the supporting-arm M in rear of the foot-lever and extends downwardly and forwardly through the bifurcated lower arm of the foot-lever and over the front end of the actuating-rod K. This latch is provided in its under side with a notch or stop-shoulder $n'$, against which the rod engages and by which the rod is locked in its rearmost position. The latch is provided in rear of its pivot with a tailpiece $n^2$. The rod is pressed forward by a spring O, which is arranged between a plate O' on the intermediate cross-sill B³ and a collar O² on the rod in front of this sill. In the forward position of the actuating-rod the gear-disk H is in mesh with the pinion $h$, the foot-lever L stands with its upper end or foot-piece in the rearward position, and the latch rests loosely on the front end of the rod, as indicated in Figs. 2 and 3. When the operator desires to throw the gear-disk H out of engagement with the pinion $h$, he presses the upper end of the foot-lever forwardly until the latch catches over the front end of the rod, as indicated in Fig. 4. This movement of the foot-lever pushes the rod rearwardly and turns the cam in the proper direction to throw the gear-disk out of mesh. The spring is now compressed and ready to shoot the actuating-rod forwardly upon releasing the latch. When the operator desires to throw the gear-disk H again into engagement with the pinion, he releases the latch from the rod by depressing the tailpiece $n^2$ of the latch with his foot. The spring now shoots the rod forward, and this movement of the rod turns the cam in the proper direction to throw the gear-disk H into mesh with the pinion $h$. This movement of the gear-disk toward the pinion is effected very quickly by the spring, and therefore very apt to engage the teeth of the disk-wheel with those of the pinion at once; but if the teeth of the gear-disk should strike against the ends of the teeth of the pinion the continued pressure of the spring will effect the engagement as soon as the further rotation of the disk-wheel has brought its teeth in the proper position to mesh with those of the pinion, and this engagement is effected without requiring any attention on the part of the operator. This foot mechanism besides being quick and reliable in its action leaves the hands of the operator free for other purposes.

P represents the hand-lever, and $p$ the rod for shifting the pinion $h$ lengthwise on the worm-shaft.

Q represents the hand-lever, and $q$ the rod for moving the worm out of gear with the worm-wheel.

The beater cylinder or drum is composed of the usual end heads R and staves $r$. The teeth S, Figs. 10, 11, and 12, are secured to the staves and are made of flat steel bars or plates. Each tooth is composed of a shank $s$ and point $s'$, both formed of a single flat plate having plane front and rear faces. The points $s'$ have flat front and rear faces and outwardly-converging side edges $s^2$. These flat plate-teeth are secured by rivets $s^3$ in recesses in the front sides of the staves. The tapering side edges of the points enable the teeth to clear themselves and prevent the teeth from becoming clogged by adhering matter when spreading soft manure or manure which contains much straw. Ordinarily in spreading such material the latter clings to the teeth or winds around the teeth until large masses have accumulated, which break loose from time to time, thereby causing uneven spreading. This difficulty is avoided by my improved teeth. The beater is driven on the right-hand side of the machine by a multiplying-gear T, of any ordinary or suitable construction.

I claim as my invention—

1. In a fertilizer-distributer, the combination of a body, a beater, gear mechanism for feeding the material in the body to the beater, which gear mechanism contains a shaft carrying a pinion and a driving gear-wheel capable of movement toward and from said pinion, a longitudinally-movable rod for moving said gear-wheel toward and from said pinion, an engaging spring arranged to move said rod in the proper direction to engage said gear-wheel with said pinion, a releasing-lever adapted to move the rod in the proper direction for disengaging said gear-wheel from said pinion, and a releasable latch for holding the rod against the pressure of the spring, substantially as set forth.

2. In a fertilizer-distributer, the combination of a body, a beater, gear mechanism for feeding the material in the body to the beater and containing a worm-shaft having a driving-pinion and a driving gear-disk capable of movement toward and from said pinion, a longitudinally-movable rod for moving said gear-disk toward and from said pinion, an engaging spring arranged to move said rod in the proper direction to engage said disk-gear with said pinion, a releasing-lever connected with the front end of said rod for moving the latter in the opposite direction to disengage said gear-disk from said pinion, and a releasable latch adapted to hold the rod against the pressure of the spring when the gear-disk is disengaged from said pinion, substantially as set forth.

Witness my hand this 17th day of May, 1902.

JOSEPH SARGENT KEMP.

Witnesses:
H. A. MILLER,
D. A. MILLER.